United States Patent [19]

Davis

[11] Patent Number: 4,959,774
[45] Date of Patent: Sep. 25, 1990

[54] SHADOW MEMORY SYSTEM FOR STORING VARIABLE BACKUP BLOCKS IN CONSECUTIVE TIME PERIODS

[75] Inventor: John E. Davis, Reseda, Calif.

[73] Assignee: Ampex Corporation, Redwood City, Calif.

[21] Appl. No.: 374,614

[22] Filed: Jun. 30, 1989

Related U.S. Application Data

[63] Continuation of Ser. No. 628,417, Jul. 6, 1984, abandoned.

[51] Int. Cl.$^5$ .................... G06F 15/00; G06F 11/30; G06F 12/16
[52] U.S. Cl. .................... 364/200; 364/248.1; 364/254.9; 364/268.2; 364/269.3; 364/273.4; 364/285; 371/12; 371/66; 365/228
[58] Field of Search .................... 364/200, 900, 134; 365/226, 228, 229; 371/12, 32, 61, 66

[56] References Cited

U.S. PATENT DOCUMENTS

| 3,916,390 | 10/1975 | Chang et al. | 365/228 |
| 4,044,337 | 8/1977 | Hicks et al. | 364/200 |
| 4,093,999 | 6/1978 | Fuller et al. | 364/900 |
| 4,291,388 | 9/1981 | Ecker, Jr. et al. | 364/900 |
| 4,413,327 | 11/1983 | Sabo et al. | 364/900 |
| 4,442,501 | 4/1984 | Eckert, Jr. et al. | 364/900 |
| 4,458,307 | 7/1984 | McAnlis et al. | 364/200 |
| 4,466,098 | 8/1984 | Southard | 371/9 |
| 4,503,494 | 3/1985 | Hamilton et al. | 364/200 |
| 4,525,800 | 6/1985 | Hamerla | 364/900 |
| 4,564,922 | 1/1986 | Muller | 364/900 |
| 4,591,976 | 5/1986 | Webber et al. | 364/200 |
| 4,654,819 | 3/1987 | Stiffler et al. | 364/200 |

FOREIGN PATENT DOCUMENTS 58-56165 4/1983 Japan .
58-103052 6/1983 Japan .
58-200358 11/1983 Japan .

OTHER PUBLICATIONS

Digital Design, 10/83, pp. 92–97, "Solid State Disks Optimize Throughput".
Hippert et al, "Saving Random Access Memory in the Event of a Power Failure", IBM TDB, vol. 17, No. 5, Oct. 1974, pp. 1449–1450.
Polivka, "Streaming-Tape Software Uses Bit-Map Copying", Mini-Micro Systems, Apr. 1984, pp. 203–208.

Primary Examiner—Thomas C. Lee

[57] ABSTRACT

A highly reliable shadow memory system is able to survive multiple fast sequence power failures and includes a volatile main memory and a shadow memory subsystem which continually monitors write accesses to the main memory. The shadow memory subsystem includes a disk drive or shadow memory storing a copy of the data in main memory. As the main memory contents are altered, the shadow memory is continually updated to reflect the changes while main utility power is available. In the event of a main utility power failure, backup power is required to store main memory data in the shadow memory for only a few storage locations for which the updating of the shadow memory may lag main memory data changes. Consequently, only a small portion of available battery backup power is required to preserve all main memory data and the system can withstand multiple rapid succession power failures without loss of data.

23 Claims, 4 Drawing Sheets

SHADOW MEMORY SYSTEM FOR STORING VARIABLE BACKUP BLOCKS IN CONSECUTIVE TIME PERIODS

This is a continuation of co-pending application Ser. No. 628,417 filed on July 6, 1984, now abandoned.

BACKGROUND OF THE INVENTION

1. Field of the Invention

This invention relates to a volatile data store with a backup storage system which is operable during a main power source failure. More particularly the invention relates to a shadow memory system in which a shadow memory is continually updated to reflect changes in data stored by the main memory so that in the event of a power failure only a small portion of the main memory data need be stored using backup power.

2. Discussion of the Prior Art

There are many data processing application in which it is important or essential to preserve data stored in a volatile memory or data store during the course of a main utility power failure. One approach that is sometimes used in critical situations is to provide a short term battery backup and an auxiliary power generator. The battery maintains the integrity of stored data while an engine driving the auxiliary generator is started and brought up to speed. While successful, this arrangement is too costly to be practical for most applications.

Another commonly used data protection approach is to rely exclusively upon a battery backup in the event of a power failure. In one alternative arrangement the battery backup is used to preserve the integrity of stored data during a power failure. However, large data stores consume large amounts of power and practical limitations on battery backup energy capacity limit data preservation to a few hours. If a power failure lasts more than a few hours critical data will be lost.

Another known battery backup alternative is to use battery power to "dump" volatile memory data into a nonvolatile memory such as a disk drive upon the occurrence of a power failure. Because of the large amount of energy required to preserve the data for a large memory, practical battery sizes limit preservation of data to one, or at most two, occurrences. Assuming that the backup batteries are rechargeable, it will typically take at least 24 hours to recharge them. However, it is not uncommon for power failures to occur in a rapid sequence of multiple failures and restarts. If more power failures occur than can be accommodated by the data preservation system, data will be lost.

SUMMARY OF THE INVENTION

A data storage system in accordance with the invention includes a volatile main memory coupled to a host CPU through a memory controller and a host CPU bus, a bus monitor circuit, a usage monitor memory, a power supply subsystem with battery backup and a shadow memory subsystem coupled to replicate in nonvolatile storage data stored by the main memory. By continually updating nonvolatile disk storage in the shadow memory subsystem to reflect changes in data stored by the volatile memory, the nonvolatile storage data remains nearly current with the volatile storage data. Upon the occurrence of a main utility power failure only a small portion of the main memory data capacity need be transferred to the nonvolatile store to produce a fully updated copy prior to power shutdown. As a result only a small amount of battery energy is required to complete the data backup in the event of a power failure and several rapid sequence power failures and restarts can be accommodated with practically sized backup batteries.

The bus monitor circuit is coupled to a main memory bus which provides data communication with the volatile main memory. Each time a write access is made to the main memory over the main memory bus, the bus monitor writes into the usage monitor memory an indication of the main memory access.

A memory multiplexer alternately grants access to the usage monitor memory to the bus monitor circuit and to the shadow memory subsystem in repetitive cycles that occur with sufficient frequency to assure that the bus monitor circuit may access the usage monitor memory each time there is a write access to the main memory.

The shadow memory subsystem repetitively accesses and sequentially reads the usage monitor memory during the times that it is granted access to the usage monitor memory by a memory multiplexer. As long as the shadow memory subsystem finds no indication of a main memory write, it merely reads the next sequential usage monitor memory location. However, if an indication of a main memory access is found the shadow memory subsystem reads all storage locations in the main memory corresponding to the indication into its nonvolatile storage, clears the indication, and then resumes sequentially reading the usage monitor memory.

Upon detection of an impending power failure by an AC power monitor within the power supply subsystem, the power supply subsystem indicates the power failure to the shadow memory subsystem and switches from main utility power to battery backup power. The shadow memory subsystem responds to the power failure indication by entering a power shutdown mode in which further data transfers between main memory and the host CPU are inhibited and the usage monitor memory is sequentially read in its entirety with the nonvolatile memory being updated to reflect the data stored at all main memory locations for which an indication of a main memory write access is found. The shadow memory subsystem then commands the power supply subsystem to enter a power down state in which battery power is used only sparingly to monitor the AC power lines.

In the event that main utility power is restored, the main memory is reinitialized with data from the nonvolatile store and data transfers between the main memory and the host CPU are again enabled. Because the nonvolatile data store was continually updated prior to the power failure, only a relatively small portion of the total main memory data was transferred to nonvolatile storage using battery backup power. Consequently, upon reinitialization of the memory system, the backup batteries still have sufficient energy capacity to accommodate several more rapid succession power failures.

BRIEF DESCRIPTION OF THE DRAWING

A better understanding of the invention may be had from a consideration of the following detailed description, taken in conjunction with the accompanying drawings in which.

DETAILED DESCRIPTION

Figure 1:
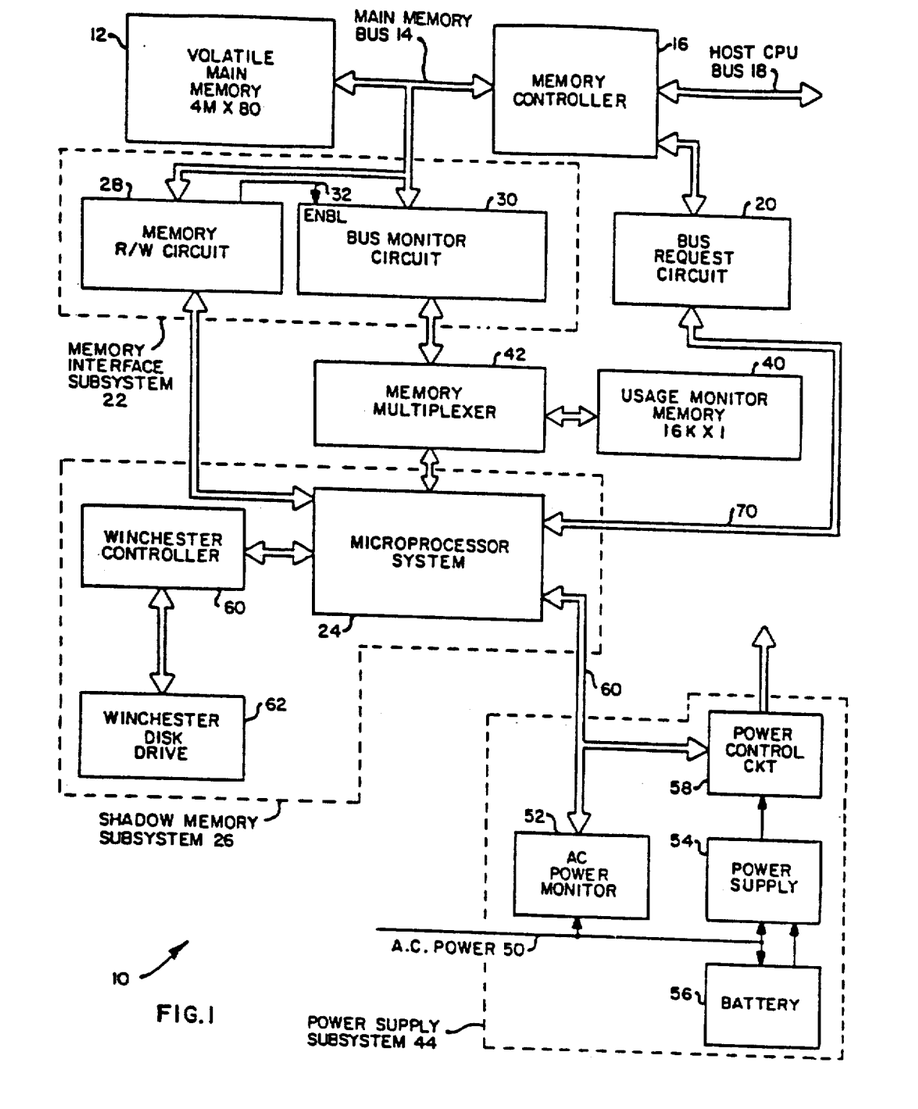
FIG. 1 is a block diagram representation of a data storage system with shadow memory backup in accordance with the invention.

Referring now to FIG. 1, a data storage system 10 in accordance with the invention includes an MOS volatile main memory 12 coupled by a main memory bus 14 through a memory controller 16 to a host CPU bus 18. The host CPU bus 18 is a conventional data processing bus providing connection between the memory controller 16 and a host CPU data processing system. In general, the memory controller 16 could be a simple interface circuit arbitrating memory access requests between the host CPU bus 18 and a bus request circuit 20.

However, in the present example memory controller 16 is configured to appear to the host CPU bus 18 to be a disk drive controller and includes a conventional direct memory access capability as well as conventional circuitry for converting between a cylinder-disk-side-sector disk drive type of address and a corresponding block of random access memory addresses. In response to read or write commands received over the host CPU bus 18, the memory controller 16 accesses the volatile main memory 12 over the main memory bus 14 to write or read an indicated sequence of data. Because the main memory 12, main memory bus 14, and memory controller 16 are implemented as a disk drive substitute, memory accesses over host CPU bus 18 normally occur for sequences of main memory 12 memory locations corresponding to one or more virtual disk sectors at a time. Consequently, volatile main memory is typically accessed in blocks of sequential memory locations. To take advantage of the sequential block accessing and improved system performance, the volatile main memory 12 has a conventional memory address register which can be either loaded with a starting address or simply incremented to the next sequential address under control of an increment signal which is part of the main memory bus 14. Consequently, when reading or writing a sequential block of data for volatile main memory 12, memory controller 16 need merely communicate the first memory address location to the address register of main memory 12. Thereafter, memory controller 16 need only activate the address increment signal on main memory bus 14 for each successive memory word location within main memory 12. Use of the incrementing memory address simplifies data communication between main memory 12 and memory controller by eliminating the need to communicate a 22 bit memory address with every word that is read from or written to main memory 12.

Main memory 12 is implemented in a maximum configuration of four million words of 80 bits each and is manufactured from conventional dynamic RAM MOS memory chips and includes conventional address decoding, refreshing, and data IO buffering. Use of the incrementing address register is not an inherent requirement of the present invention but merely a convenience which results from the use of main memory 12 as a fast access disk drive substitute.

A memory interface subsystem 22 couples to the main memory bus 14 and provides an interface between the volatile main memory 12 and a Z80 based microprocessor system 24 within a shadow memory subsystem 26.

The memory interface subsystem 22 includes a memory read/write circuit 28 and a bus monitor circuit 30. Memory read/write circuit 28 provides a conventional read/write memory interface between microprocessor system 24 and the main memory bus 14 which enables microprocessor system 24 to selectively read and write data at word locations within main memory 12.

Bus monitor circuit 30 receives as an enable input a LOCAL USE* signal 32 which is derived as a busy signal for memory read/write circuit 28 and enables bus monitor circuit 30 whenever memory read/write circuit 28 is not accessing main memory 12. Bus monitor circuit 30 thus operates to monitor data transfers between the memory controller 16 and main memory 12 over main memory bus 14. Bus monitor circuit 30 includes an incrementable address register which duplicates the address register within main memory 12 and is loaded or incremented in sychronism with the address register of main memory 12 so that the bus monitor circuit address register continually reflects the contents of the volatile main memory 12 address register. . This duplicate address register would not be required for a traditional main memory 12 which received an address over main memory bus 14 in conjunction with each data access. However, bus monitor circuit 30 must have information as to the address for each write type of data transfer to main memory 12. The duplicate address register provides this information in the special circumstance where sequential memory address locations are indicated by the address register increment signal without a complete memory address being transferred for each data access.

Each time bus monitor circuit 30 detects a write type of data transfer between memory controller 16 and main memory 12, it writes a logic "1" into a usage monitor memory 40 after gaining access to memory 40 through a memory multiplexer 42.

Usage monitor memory 40 is a 16K by 1 bit single chip memory which is bit mapped to provide a correspondence between each location within usage monitor memory 40 and a block of word locations within volatile main memory 12. In the present instance, each memory location within usage monitor memory 40 corresponds to a block of 256 80 bit word locations within volatile main memory 12. A functional correspondence between addresses of usage monitor memory 40 and addresses of main memory 12 is established by simply selecting the 14 most significant address bits from main memory bus 14 into main memory 12 to address usage monitor memory 40. The 8 least significant bits of the 22 bit address required to access main memory 12 are simply truncated or ignored. Bus monitor circuit 30 may thus be an extremely simple circuit which simply responds to the occurrence of a write state on the traditional read/write signal which extends as part of main memory bus 14. Each time a write state occurs on this read/write signal, bus monitor circuit 30 operates to communicate the 14 most significant bits of its duplicate address register as an address input through memory multiplexer 42 to usage monitor memory 10 and writes a single bit logic "1" into the addressed memory location. The consequence of this operation is that each time data is written into a block of memory in main memory 12, a logic 1 is written into a memory location of usage monitor memory 40 which corresponds to that block.

In a typical memory access procedure, memory controller 16 would receive a request over host CPU bus 18 which would involve sequentially writing data into each word location within a block or even into all of the word locations within several sequential blocks within main memory 12. However, bus monitor circuit 30 can be implemented in a quite simple manner and need not keep track of whether or not sequential accesses are being made except as required to update the replica address register which is maintained internally of bus monitor circuit 30. Thus, in the event that all 256 word locations within a block of memory within main memory 12 are written sequentially, bus monitor 30 would respond accordingly by writing into the single memory location corresponding thereto in usage monitor memory 256 times in respective sequence.

Memory multiplexer 42 operates to insure frequent access to usage monitor memory 40 to both the bus monitor circuit 30 and to the shadow memory subsystem 26. Memory multiplexer 42 can operate on any conventional basis such as a priority request basis or time division multiplex basis which enables bus monitor circuit 30 to have access to usage monitor memory 40 each time a write access is made to main memory 12 by memory controller 16. In the present instance usage monitor memory 40 is capable of operating twice as fast as main memory 12 so that memory multiplexer 42 merely operates on a conventional time division multiplex basis to make available one cycle of usage monitor memory 40 to both the monitor circuit 30 and shadow memory subsystem 26 during each cycle of main memory 12. In any event, it is sufficient that memory multiplexer 42 allow bus monitor circuit 30 access to usage monitor memory 40 each time a write access is made to a new block of data within main memory 12 and that shadow memory subsystem 26 have frequent access to usage monitor memory 40. The more restricted the access of shadow memory subsystem 26 to usage monitor memory 40 the less efficient will be the emergency power saving features of the data storage system 10.

Before describing the shadow memory subsystem 26 in greater detail it will be helpful to understand the operation of power supply subsystem 44. Power supply subsystem 44 receives standard 60 Hz AC electrical utility power as a main power source 50 which is communicated to an AC power monitor 52, a power supply 54, and to a battery 56 through suitable conventional DC conversion circuitry which continuously recharges or maintains the charge upon battery 56. AC power monitor 52 is a conventional power monitor circuit which continuously responds to the input utility power voltage level. If the input power voltage level drops below a selected threshold, AC power monitor circuit 52 provides a signal to microprocessor system 24 and also to a power control circuit 58. AC power monitor circuit 52 similarly indicates a resumption of adequate power after a power failure. Microprocessor system 24 responds to a power failure indication by initiating a data preservation and power shutdown mode in response to a power on indication by initiating a data restoration mode of operation.

Power supply 54 includes the conventional transformer, rectification and filtering circuitry required to produce the DC voltage levels used throughout the data storage system 10. As long as adequate AC utility power is available from main power source 50 power supply 54 utilizes this available power. In the event of a main utility power failure, however, power supply 54 immediately begins extracting power from backup battery 56.

Power control circuit 58 receives the power from power supply 54 and distributes it to the remainder of the data storage system 10 under control of microprocessor system 24. In a conventional manner, power control circuit 58 switches the power provided to various components in the data storage system 10 as necessary to maintain normal operation. For example, while AC utility power is available all portions of the system are energized. However, while operating on backup power from battery 56, only those portions of the system required for a current operating mode are energized in order to conserve available backup energy. Upon completion of a battery energized data preservation mode following an AC power failure, microprocessor 24 provides to power control circuit 58 a PRESERVATION COMPLETE signal through connector bus 60. Power control circuit 58 responds to this PRESERVATION COMPLETE signal by terminating power to all portions of the data storage system 10 except power supply 54, the power control circuit 58 itself, and AC monitor circuit 52. This portion of the circuit consumes very little standby energy and the data storage system 10 is capable of surviving a utility power failure in excess of several days in duration. Upon resumption of utility power through main power source 50, AC power monitor 52 signals power control circuit 58 and microprocessor system 24 over connector bus 60. This signal causes power control circuit 58 to resume distribution of power to all parts of data storage system 10 and initiates a power on reset for microprocessor system 24 which then proceeds to execute a data initialization operation for volatile main memory 12 and then enable normal operation for data storage system 10.

The shadow memory subsystem 26 includes in addition to the Z80 based microprocessor system 24 a Winchester disk drive controller 62 which couples the microprocessor system 24 to a large, nonvolatile data store which is implemented in the form of a Winchester disk drive 62 in the present example. The Winchester disk drive 62 must be capable of storing all of the data in volatile main memory 12 which in the present example is 40 megabytes. If main memory 12 is implemented in a smaller configuration the Winchester disk drive 62 may have a smaller capacity also. In addition, while disk drive 62 is shown as a single drive having a capacity of at least 40 megabytes, it could conventionally be implemented as two 20 megabyte disk drives or any other suitable configuration having adequate storage capacity. Although not explicitly shown, the microprocessor system 24 includes conventional instruction and scratchpad memory as well as conventional bus drivers, interface circuits and interrupt controllers as necessary to accomplish its system monitoring, data preservation, and data restoration functions.

Figure 2:
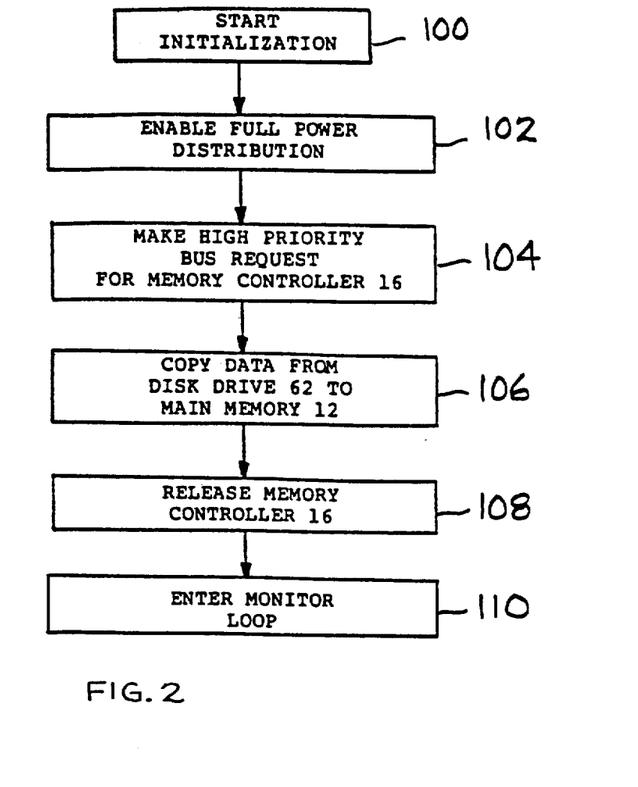
FIG. 2 is a flow chart representation of an initialization routine.

The operating sequence for microprocessor system 24 is illustrated in FIG. 2. At startup, whether as a result of power turnon or restoration of main utility power, a power on reset vectors microprocessor system 24 to a start initialization routine, step 100, as illustrated in FIG. 2. Microprocessor system 24 first issues a command over bus connector 60 to the power supply subsystem 44 to enable full power distribution, step 102, to all portions of the data storage, system, 10. Next, microprocessor 24 issues a command, step 104, over a bus connection 70 to bus request circuit 20 to make a high priority bus request to memory controller 16.

Bus request circuit 20 is a standard bus request interface circuit and is capable of making bus requests of either higher priority than CPU bus 18 or of lower priority as commanded by microprocessor system 24. The high priority bus request assures that the microprocessor system 24 and bus request circuit 20 gain control of memory controller 16 immediately if it is not occupied by a request from host CPU bus 18 or if it is so occupied, at the first time that memory controller 16 is relinquished by host CPU bus 18. The high priority request locks out any further accesses to memory controller 16 from host CPU bus 18 while the high priority request remains active.

Figure 3:
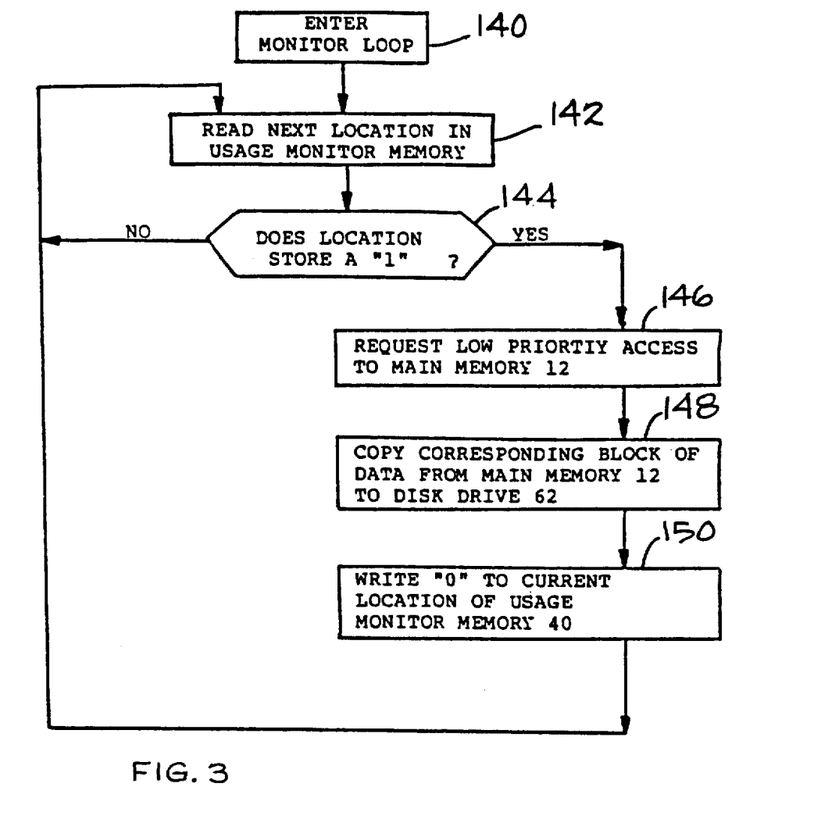
FIG. 3 is a flow chart representation of a monitor loop routine.

Upon gaining control of memory controller 16, microprocessor system 24 proceeds to copy the backup image copy, step 106, of the volatile main memory contents 12 stored in Winchester disk drive 62 from the drive 62 into main memory 12. Although the microprocessor 24 gains control of memory controller 16 to lock out the host CPU bus 18, the data transfers are made directly over the main memory bus 14 to main memory 12 and bypass the memory controller 16. The transfers are made on a block-by-block basis from Winchester disk drive 68 through Winchester controller 62 to internal RAM microprocessor system 24 and then from the microprocessor system 24 RAM through memory read/write circuit 28 and main memory bus 14 to main memory 12. The memory read/write circuit 28 merely provides a conventional interface to the main memory bus 14 to enable microprocessor system 24 to read and write the volatile main memory 12. When the complete backup memory data image has been transferred from Winchester disk drive 62 to main memory 12, the microprocessor system 24 commands bus request circuit 22 to release the memory controller 16 by terminating the high priority bus request, step 108. Normal data transfers between host CPU bus 18 and main memory 12 through memory controller 16 are thus enabled. After releasing memory controller 16 the microprocessor system enters a monitor loop, step 110, which is illustrated in FIG. 3.

Microprocessor system 24 maintains an address register for usage monitor memory 40. While different configurations are of course possible, a typical technique for maintaining the usage monitor memory address register would be to utilize a storage location within the internal random access memory of microprocessor system 24. Accesses to usage monitor memory 40 are then made using an indirect addressing mode through this address storage location. In any event, while in the monitor loop, step 140, the microprocessor system 24 sequentially reads each of the 16K storage locations with usage monitor memory 40 on a repetitive cycle basis. Upon reading each storage location, step 142, microprocessor tests for the storage of a logic 1 data state, step 144. It will be recalled that on alternate cycles of usage monitor memory 40 memory multiplexer 42 grants access to usage monitor memory 40 to the bus monitor circuit 30. If a write data transfer has occurred between host CPU bus 18 and main memory 12, bus monitor circuit 30 writes a logic 1 data bit into usage monitor memory 40 at the location in usage monitor memory 40 corresponding to the block of addresses in main memory 12 to which the main memory 12 has been written.

Thus, when microprocessor system 24 tests the data bit from usage monitor memory 40 for logic 1, step 144, if it finds that no logic 1 is stored in the accessed location, this means that no data has been written into the corresponding block of data in the main memory 12. Microprocessor system 24 then proceeds to merely increment the usage monitor memory address and continues reading the next memory location, step 142.

However, if upon accessing a usage monitor memory 40 storage location, the microprocessor 24 finds a logic 1 stored thereat, this means that data has been written into the main memory 12 at some location within the corresponding block of data therein. As a consequence, the backup data image of main memory 12 stored in disk drive 62 no longer matches the data stored in main memory 12 for this block of data. Microprocessor system 24 responds to this discrepancy by communicating through bus 70 and bus request circuit 20 a low priority bus request to memory controller 16, step 146. This low priority bus request will not interrupt or supersede any bus request to memory controller 16 received over host CPU bus 18. However, as soon as memory controller 16 enters an idle state, the bus request is granted back through bus request circuit 20 to microprocessor system 24.

Upon gaining control of memory controller 16 microprocessor system 24 then proceeds to read the block of 256 memory locations in volatile main memory 12 corresponding to the last accessed location in usage monitor memory from the main memory 12 into corresponding locations within disk drive 62. Upon updating the data stored by disk drive 62, step 148 with the complete block of data, the integrity of the backup image data copy is restored for that block and microprocessor system 24 commands bus request circuit 20 to release the memory controller back to the host CPU bus 18. Microprocessor system 24 then writes a 0 into the currently addressed location within usage monitor memory 40, thus clearing that location and indicating that the backup image data copy stored by disk drive 62 accurately reflects the corresponding block of data in main memory 12, step 150. The microprocessor system 24 then resumes its process of reading each successive memory location usage monitor memory 40 looking for the storage of a logic 1 data bit which is an indication that the corresponding block of data stored by volatile main memory 12 has been changed since the image copy thereof was last updated in Winchester disk drive 62, step 142.

Under normal circumstances, this process continues indefinitely. As a 256 word block of data is changed in main memory 12 the bus monitor circuit 30 writes a logic 1 into the corresponding data storage location in usage monitor memory 40 as an indication of the change. Concurrently, and on alternate half cycles, microprocessor subsystem 24 reads sequential address locations in usage monitor memory 40 looking for the stored 1's. Each time it finds one it updates the corresponding block of image data in Winchester disk drive 62 and clears the logic 1 data bit from usage monitor memory 40. As a consequence, the image data copy of main memory 12 data within Winchester disk drive 62 is continually being updated as changes are made in main memory 12 data with any lag between the updating of Winchester disk drive 62 and changing of main memory 12 being reflected by storage of logic 1 indications for corresponding locations in usage monitor memory 40.

Experimental test data suggests that at any point in time it is unlikely that there will be more than four or five blocks of data which have been changed in volatile main memory 12 without the image thereof being updated in Winchester disk drive 62. As a consequence, upon the occurrence of a main utility power failure, the microprocessor system 24 need only transfer these four or five blocks of data from main memory 12 to Winchester disk drive 62 in order to assure that the image data copy stored by Winchester disk drive 62 exactly matches the data stored by main memory 12 prior to a power shutdown pending the duration of the utility power failure.

While any correspondence between the memory locations within volatile main memory 12 and storage locations with Winchester disk drive 62 can be utilized, the present invention advantageously provides a direct correlation between five sequential sectors within Winchester disk drive 62 and a block of 256 words within volatile main memory 12. It will be recalled that when the four million word locations main memory 12 are divided by the 16K storage locations within usage monitor memory 40 the result is 256 which means that a block of 256 word locations within main memory 12 must correspond to each different address within usage monitor memory 40. The 80 bit word length for main memory 12 means that there are ten 8 bit bytes for each word and a block of 256 word locations thus stores 2560 bytes of information. This matches exactly the storage capacity of five standard sized 512 byte sectors within Winchester disk drive 62. It is thus advantageous to establish a direct correspondence between five sequential sectors within Winchester disk drive 62 and a block of 256 words within volatile main memory 12.

Figure 4:
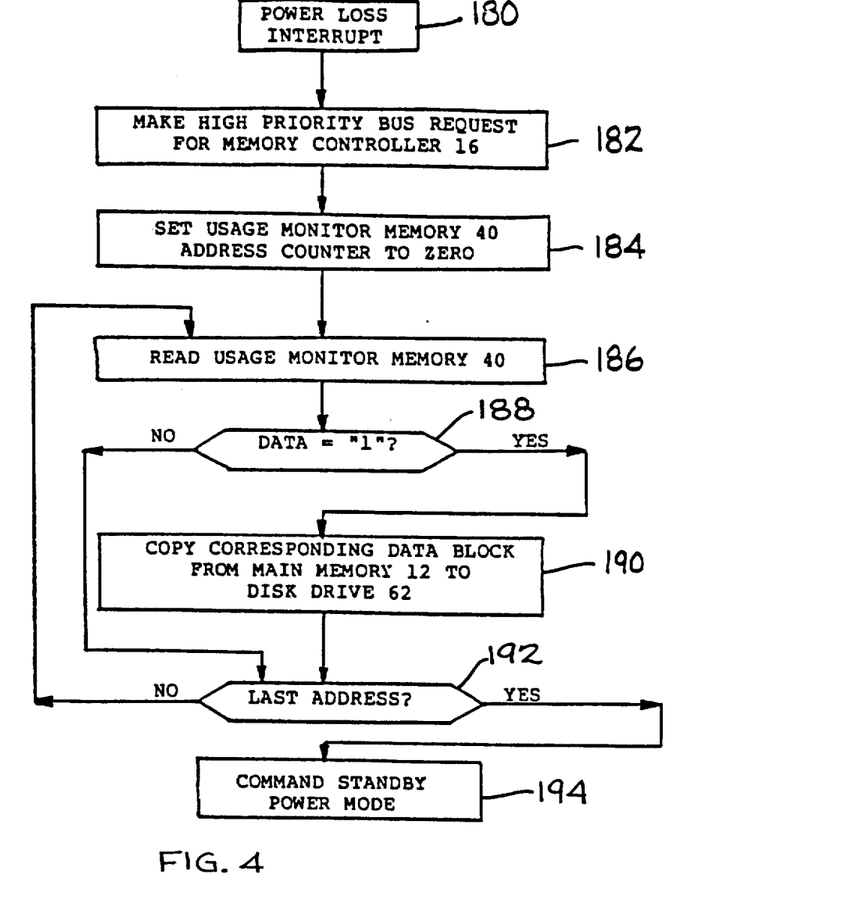
FIG. 4 is a flow chart representation of a power loss interrupt routine.

Upon the occurrence of a power outage, AC monitor circuit 52 generates the LOW POWER signal over bus 60 which is communicated as a high priority interrupt request to microprocessor system 24. This interrupt request interrupts microprocessor system 24 immediately and causes it to begin executing a power loss interrupt routine which is illustrated in FIG. 4. Upon entering the power loss interrupt routine, step 180, microprocessor system 24 communicates through connector bus 70 and bus request circuit 20 a high priority bus request to memory controller 16, step 182. Upon gaining access to memory controller 16 the data transfers over host CPU bus 18 are locked out and microprocessor system 24 sets the address register for usage monitor memory 40 to 0 so that each addressed location within usage monitor memory 40 can be read in sequence exactly once, step 184. The microprocessor system 24 then enters a loop which is substantially the same as the monitor loop shown in FIG. 3. Each sequential address within usage monitor memory 40 is read looking for a logic 1 data bit indicating that the corresponding block of image data in Winchester disk drive 62 does not match the data stored by main memory 12, step 188.

As soon as a logic 1 is found, the corresponding image block in disk drive 62 is updated and a 0 is written into usage monitor memory 40, step 190. After all of the storage locations within usage monitor memory 40 have been read, step 192, as indicated by encountering the highest address of 16K-1, the power loss interrupt exits the monitor preservation loop and issues a command over bus 60 for power supply subsystem 44 to enter a standby power mode, step 194. In this mode power control circuit 58 terminates power to all of the circuitry of main storage system 10 except those components required to maintain secure data storage and respond to a restoration of main utility power through source 50. In the present example, power need be maintained only to AC power monitor 52 and certain responsive portions of power control circuit 58. In general, other portions of the system 10 may require standby power, depending upon specific limitations. For example, were the nonvolatile storage to be provided by a large CMOS memory instead of a Winchester disk drive 62, it might be necessary to provide a small amount of standby power to the CMOS memory.

In any event, because only a few blocks of data need be written into the nonvolatile memory upon the occurrence of a power failure, only a few seconds worth of battery power are consumed instead of the 15 to 20 minutes that might be typically required to completely copy all of the four million words of data from volatile main memory 12 into the disk drive 62 or other nonvolatile storage. As a consequence, 10 to 20 or more rapid sequence power failures could occur and be fully accommodated by the data storage system 10.

In contrast, a conventional system would require substantially all of the power of battery 56 to provide the backup image of memory 12 data in the nonvolatile memory upon the occurrence of a power failure. Upon restoration of power, it would then take typically 24 hours for battery 56 to be recharged from the utility power supply. If a second or subsequent power failure occurred within this time, the system would shut down but there would be insufficient energy in battery 56 to update the nonvolatile memory with a correct image of the data stored by main memory 12. Important data might thus become lost.

While there has been shown and described above a data storage system with a shadow memory subsystem maintaining the integrity of stored data throughout multiple rapid sequential power failures for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

What is claimed is:

1. A data storage system for a host computer having a CPU bus, comprising:

a volatile main memory coupled to the CPU bus;

a usage monitor memory having a plurality of address locations;

bus monitor means for monitoring data transfers between the volatile memory and the CPU bus and, in response to each write type of data transfer between the volatile main memory and the CPU bus, storing in the usage monitor memory an indication of the data transfer;

a shadow memory subsystem including a nonvolatile data store, the shadow memory subsystem comprising means, coupled to said usage monitor memory, for determining when said bus monitor means is not accessing said usage monitor memory and for providing access of the shadow memory subsystem to said usage monitor memory upon which determination and means for sequentially searching variable numbers of the usage monitor memory address locations during consecutive variable length time periods when the bus monitor means is not accessing the usage monitor memory for an indication of a data transfer, and continually searching the entire plurality of address locations during said consecutive time periods, means, upon finding an indication, for responding to the indication by reading from the volatile main memory any data stored at a location to which the indication relates and writing the data read from the volatile main memory to the nonvolatile data store, and means for erasing the indication from the usage monitor memory.

2. The data storage system according to claim 1 above, further comprising a power supply subsystem coupled to provide operating power to the volatile main memory in response to utility supplied power, the usage monitor memory, the bus monitor means and the shadow memory subsystem, the power supply subsystem including an energy source storing sufficient energy to maintain the data storage system in a functioning condition for a limited time following a utility power failure.

3. The data storage system according to claim 1 above, wherein each address location within the usage monitor memory corresponds to a predetermined plurality of address locations in the main memory.

4. The data storage system according to claim 2 above, wherein each bit of data stored by the usage monitor memory corresponds to a predetermined plurality of address locations in the main memory.

5. The data storage system according to claim 4 above, wherein each address location in the main memory stores a multibit word.

6. The data storage system according to claim 2 above, wherein the power supply subsystem includes an AC power monitor coupled to sense the availability of power on utility power lines and to generate a power loss indication signal whenever the power level on the utility power lines is insufficient to support normal operation of the data storage system.

7. The data storage system according to claim 6 above, wherein the shadow memory subsystem is coupled to receive the power loss indication signal and further comprise means responsive to the power loss indication signal for inhibiting further data transfers between the main memory and the CPU bus, and wherein said means for continually searching responds to the power loss indication signal by searching the usage monitor memory and said reading and writing means and erasing means responding to each indication of a data transfer by storing all data in the main memory corresponding to the indication in the nonvolatile data store and erasing the indication respectively, and said shadow memory subsystem further comprises means, when the usage monitor memory has been cleared of all indications of data transfers, for generating a power down command commanding the power supply subsystem to terminate the supply of power to the data storage system and thereby conserve energy stored by the energy source.

8. The data storage system according to claim 1 above, wherein the nonvolatile data store is a magnetic remanent flux type of store.

9. The data storage system according to claim 1 above, wherein the nonvolatile data store is a disk drive.

10. The data storage system according to claim 1 above, wherein the nonvolatile data store is a disk drive of type having a sealed container enclosing a rigid magnetic disk and at least one movable read/write head.

11. The data storage system according to claim 1 above, further comprising a memory controller coupled between the main memory and the host CPU bus and simulating a disk drive controller to enable data transfers between the host CPU bus and main memory as though the main memory were a disk drive.

12. A data storage system for a host CPU having a CPU bus, comprising:

a volatile main memory having a plurality of blocks of addressable storage locations;

a main memory bus;

memory controller means, coupled to the main memory bus, for communicating data between the main memory and the CPU bus;

a usage monitor memory having a plurality of storage locations each corresponding to a predetermined block of addressable storage locations in the main memory;

memory multiplexer means, coupled to the usage monitor memory, for selectively accessing the usage monitor memory;

bus monitor circuit means, coupled to the main memory bus and the memory multiplexer means, for monitoring data transfers between the main memory and the memory controller for communication over the host CPU bus and for responding to each write type of data transfer by assuring that an indication of memory usage is stored in the usage monitor memory at a storage location which corresponds to the main memory block at which the write data transfer occurs;

a power supply subsystem coupled to receive power from an externally supplied interruptible power source and including a limited duration uninterruptible power source, the power supply subsystem including means for supplying power to the data storage system with the supplied power being taken from the interruptible power source when possible and otherwise from the interruptible power source, the power supply subsystem including a power monitor coupled to monitor the interruptible power source and generate a power supply signal indicating whether or not the power available from the interruptible power source is adequate to operate the data storage system; and a shadow memory subsystem including a nonvolatile data store, the shadow memory subsystem being coupled to the memory multiplexer means and to the power supply subsystem, the shadow memory subsystem further including:

means for continually searching while the power supply signal indicates an availability of adequate power for indications of main memory usage stored in the usage monitor memory by making repetitive usage monitor memory read accesses when the bus monitor means is not accessing the usage monitor memory and, upon finding an indication of memory usage, executing a shadow storage operation upon main memory data corresponding to the indication by reading data from all address locations of the main memory within the block which corresponds to the indication, writing the data into corresponding locations in the nonvolatile data store and erasing the indication of memory usage, and means for operating, while the power supply signal indicates a nonavailablity of adequate power, to generate a main memory inhibit signal inhibiting further data transfers between the main memory and the CPU bus, to search each location of the usage monitor memory for an indication of main memory usage, to execute a shadow storage operation for each indication of main memory usage, and to command termination of the supply of power to the data storage system.

13. The data storage system according to claim 12 above, wherein the power supply subsystem includes a power control circuit coupled to terminate distribution of power to the data storage system in response to a command generated by the shadow memory subsystem to terminate power, and to reinitiate distribution of power to the data storage system following termination of power whenever the interruptable power source supplies sufficient power to operate the data storage system.

14. The data storage system according to claim 13 above, wherein the shadow memory subsystem further operates upon reinitiation of the distribution of power following a termination of power distribution to restore the data content of the main memory by reading the data from the nonvolatile memory and writing it into the main memory and then terminate the inhibiting of data transfers between the main memory and the CPU bus.

15. A data storage system for a host CPU having a CPU bus, comprising:

a volatile main memory having a plurality of blocks of addressable storage locations;

a main memory bus;

memory controller means, coupled to the main memory bus, for communicating data between the main memory and the CPU bus;

a usage monitor memory having a plurality of storage locations each corresponding to a predetermined block of addressable storage locations in the main memory;

memory multiplexer means, coupled to the usage monitor memory, for selectively accessing the usage monitor memory, bus monitor circuit means, coupled to the main memory bus and the memory multiplexer means, for monitoring data transfers between the main memory and the memory controller for communication over the host CPU bus and for responding to each write type of data transfer by assuring that an indication of memory usage is stored in the usage monitor memory at a storage location which corresponds to the main memory block at which the write data transfer occurs;

a power supply subsystem coupled to receive power from an externally supplied interruptible power source and including a limited duration uninterruptible power source, the power supply subsystem including means for supplying power to the data storage system with the supplied power being taken from the interruptible power source when possible and otherwise from the uninterruptible power source, the power supply subsystem including a power monitor coupled to monitor the interruptible power source and generate a power supply signal indicating whether or not the power available from the interruptible power source is adequate to operate the data storage system;

a shadow memory subsystem including a nonvolatile data store, the shadow memory subsystem being coupled to the memory multiplexer means and to the power supply subsystem, the shadow memory subsystem further including:

means for searching while the power supply signal indicates an availability of adequate power for indications of main memory usage stored in the usage monitor memory by making repetitive usage monitor memory read accesses and, upon finding an indication of memory usage, executing a shadow storage operation upon main memory data corresponding to the indication by reading data from all address location of the main memory within the block which corresponds to the indication, writing the data into corresponding locations in the nonvolatile data store and erasing the indication of memory usage, and means for operating, while the power supply signal indicates a nonavailability of adequate power, to generate a main memory inhibit signal inhibiting further data transfer between the main memory and the CPU bus, to search each location of the usage monitor memory for an indication of main memory usage, to execute a shadow storage operation for each indication of main memory usage, and to command termination of the supply of power to the data storage system; and a bus request circuit coupling the shadow memory subsystem to the memory controller means, the bus request circuit operates while adequate power is available to respond to main memory access requests from the shadow memory subsystem by communicating to the memory controller a relatively low priority request for access to the main memory, and being responsive to the inhibit signal to make a highest priority request to the memory controller for access to the main memory.

16. The data storage system according to claim 12 above, further comprising a memory read/write circuit coupled between the shadow memory subsystem and the main memory, the memory read/write circuit being responsive to read and write commands from the shadow memory subsystem to provide address and control signals to the main memory which are required for data transfers therewith.

17. A backup data storage system for a primary data store having a plurality of storage locations addressable by a data processing system, each primary data store addressable storage location being assigned to one of a plurality of primary store data blocks, each containing the data stored by all of the addressable storage locations assigned thereto, the backup data storage system comprising:

first means for storing a write indication at each of a plurality of addressable storage locations, each of which has a predetermined correspondence with one of the data block;

means for writing a write indication into the first means for storing a write indication each time data is written by the data processing system into the primary data store, the write indication being stored at a location corresponding to a primary store data block into which the data has been written;

second means for storing a plurality of backup data blocks, each corresponding to a different primary store data block; and data processing means, connected to the first storing means, the means for writing a write indication, the second storing means, and the primary data store, comprising means coupled to the first storing means for determining when said writing means is not accessing the first storing means, means for continually accessing said first storing means when said first storing means is available for data communication and for repetitively reading sequential addressable storage locations of the first storing means, wherein the number of addressable storage locations read varies with the time during which said first storing means is available for data communications, and means, upon reading a write indication from a currently addressed storage location, for copying the primary store data block corresponding thereto to the corresponding backup data block stored by the second storing means.

18. The backup data storage system according to claim 17 above,
wherein the data processing means further includes means responsive to a failure of a main power supply for the backup data storage system for preserving primary data store data by
(1) generating a signal that is connected to means for disabling data communication between the primary data store and the data processing system,
(2) sequentially reading each addressable storage location of the first means for storing a write indication and each time a write indication is read from a currently addressed location, copying the primary store data block corresponding thereto to the corresponding backup data block stored by the second means for storing a plurality of backup data blocks, and
(3) generating a power termination signal commanding that power distribution to the primary data store be terminated.

19. The backup data storage system according to claim 18 above, wherein the data processing means further includes means responsive to a restoration of power from the main power supply for restoring primary data store data by
(1) generating said signal that is connected to means for disabling data communication between the primary data store and the data processing system,
(2) copying each backup data block to the primary store data block corresponding thereto stored by the primary data store, and
(3) terminating the generating of said signal that is connected to means for disabling data communication.

20. The backup data storage system according to claim 19 above, further comprising means for supplying power coupled to receive power from the main power supply when available and including an alternative source of power that is used when power is not available from the main power supply, the power supplying means including power switching means responsive to the power termination signal that is connected to supply power to the primary data store with the power to the primary data store being switched off in response to receipt of the power termination signal and switched on in the absence of the power termination signal.

21. A method of backing up data in a primary data store having a plurality of addressable storage locations storing the data and coupled for communication with a data processing system, the method using a usage monitor memory having a plurality of addressable storage locations and a nonvolatile shadow data store, the method comprising the steps of:
assigning each addressable storage location in the primary data store to one of a plurality of different blocks of storage locations;
establishing a correspondence between each of the blocks of locations and a different addressable storage location in the usage monitor memory;
writing a data write indication into the usage monitor memory each time data is written into an addressable storage location of the primary data store from the data processing system, the data write indication being written to a usage monitor memory location corresponding to the block of storage locations to which is assigned the primary data store addressable location at which the data was written; and
continually accessing the usage monitor memory when the usage monitor memory is not being written with write data indications and repetitively reading in sequence the addressable storage locations of the usage monitor memory which correspond to a block of locations in the primary data store, and upon reading a data write indication from any given location in the usage monitor memory
(1) copying to the nonvolatile shadow data store all data stored by the primary data store at addressable locations assigned to the block of locations corresponding to the given location in the usage monitor memory, and
(2) clearing the data write indication from the given location in the usage monitor memory.

22. The method according to claim 21 above, further comprising the steps of:
executing a data preservation sequence upon the occurrence of a loss of power from a primary power source, the data preservation sequence comprising the steps of:
(1) disabling data communication between the primary data store and the data processing system,
(2) sequentially reading each addressable storage location of the usage monitor memory and, upon reading a data write indication from any given location in the usage monitor memory, copying to the shadow data store all data stored by the primary data store at addressable locations assigned to the block of locations corresponding to the given location in the usage monitor memory, and
(3) commanding a power preservation mode in which reduced power is used by the primary data store pending restoration of power from the primary power source.

23. The method according to claim 22 above, further comprising the steps of:
executing a data restoration sequence upon the restoration of power from the primary power source following a loss of power from the primary power source, the data restoration sequence comprising the steps of:
(1) disabling data communication between the primary data store and the data processing system,
(2) copying an image of primary data store data stored by the shadow data store to the primary data store,
(3) enabling communication of data between the primary data store and the data processing system, and
(4) executing said continually reading step.

* * * * *